(12) United States Patent
Han

(10) Patent No.: US 8,605,055 B2
(45) Date of Patent: Dec. 10, 2013

(54) CAPACITIVE TOUCH PANEL

(75) Inventor: Sang Hyun Han, Anyang-si (KR)

(73) Assignee: Pointchips Co., Ltd., Seoul (KR)

(*) Notice: Subject to any disclaimer, the term of this patent is extended or adjusted under 35 U.S.C. 154(b) by 160 days.

(21) Appl. No.: 13/339,839

(22) Filed: Dec. 29, 2011

(65) Prior Publication Data
US 2012/0098790 A1   Apr. 26, 2012

Related U.S. Application Data

(63) Continuation of application No. PCT/KR2010/004096, filed on Jun. 24, 2010.

(30) Foreign Application Priority Data

Jun. 29, 2009 (KR) .................. 10-2009-0058350

(51) Int. Cl.
*G06F 3/045* (2006.01)
(52) U.S. Cl.
USPC .......................................... 345/174; 345/173
(58) Field of Classification Search
None
See application file for complete search history.

(56) References Cited

U.S. PATENT DOCUMENTS 6,825,833 B2 * 11/2004 Mulligan et al. .............. 345/174
2008/0259044 A1   10/2008 Utsunomiya et al.

FOREIGN PATENT DOCUMENTS

| JP | 2008-269297 | 11/2008 |
| KR | 10-2007-0115744 | 12/2007 |
| KR | 10-2009-0000921 | 1/2009 |
| KR | 10-2009-0038863 | 4/2009 |
| KR | 10-2009-0048770 | 5/2009 |

* cited by examiner

*Primary Examiner* — Jason Olson
(74) *Attorney, Agent, or Firm* — Sherr & Jiang, PLLC

(57) ABSTRACT

The present invention relates to a touch panel. A capacitive touch panel, in which a location of a touch is sensed based on a variation in capacitance which is generated in an electrode upon a touch, includes one or more electrodes each configured to have an uniform resistance component in one direction on a substrate, and to pass a reference signal therethrough from a first side portion thereof to a second side portion thereof; and a location detection unit configured to apply the reference signal to the first side portion of the electrode, to receive a reference signal, altered by a resistance and a capacitance formed in the electrode upon a touch while passing through the electrode, via the second side portion of the electrode, and to determine a location of the touch by comparing the reference signal and the received altered reference signal.

12 Claims, 9 Drawing Sheets

CAPACITIVE TOUCH PANEL

CROSS REFERENCE TO PRIOR APPLICATIONS

This application is Continuation of PCT International Application No. PCT/KR2010/004096 (filed on Jun. 24, 2010) designating the United States, which claims priority to Korean Patent Application No. 10-2009-0058350 (filed on Jun. 29, 2009), which are all hereby incorporated by reference in their entirety.

BACKGROUND

The present invention relates to a capacitive touch panel and, more particularly, to a capacitive touch panel in which location sensing means formed in the touch panel is configured to receive a reference signal, the voltage of which has been altered by resistance and capacitance formed in an electrode while passing through the electrode when a touch is made while a reference signal is being applied to the first side portion of the electrode, via the second side portion of the electrode, thereby accurately measuring a variation in voltage compared to a conventional touch panel.

As electronic engineering technology and information technology have repeatedly advanced, the importance of electronic devices in daily life including a work environment has been steadily increasing.

In recent years, the types of electronic devices have diversified. In particular, in the field of portable electronic devices, such as mobile phones and Portable Multimedia Players (PMPs), a vast number of devices with new designs to which new functionalities have been added have been released almost every day.

As the types of electronic devices which people encounter in daily life have gradually diversified and the functionalities of electronic devices have become advanced and complicated, there has been an urgent need for a user interface which users can easily learn and which can be manipulated intuitively.

Touch screen devices have attracted attention as input devices capable of meeting such a need, and have already been widely applied to a variety of electronic devices.

A touch screen device is a device that senses the location of a touch of a user on a display screen and performs overall control of the electronic device, including the control of the display screen, using information about the sensed location of the touch as input information.

Methods of sensing the location of a touch on a touch screen device may be divided into discrete location detection and continuous location detection.

Discrete location detection is also referred to as a so-called matrix method, and is a method of dividing a 2D flat surface on a panel into a plurality of sections and sensing the presence of a touch in each of the sections.

In contrast, continuous location detection is a method in which a touch detection area is not divided into a limited number of sections and the location of a touch on a 2D flat surface is sensed in the form of successive values.

A continuous location detection-based touch screen device usually employs a specific algorithm in order to calculate successive coordinates from values measured using a limited number of electrodes.

FIG. 1 is a drawing illustrating a conventional continuous location detection-based capacitive touch panel.

As shown in FIG. 1, the continuous location detection-based capacitive touch panel determines the location of a contact by sensing a variation in voltage attributable to resistance $R_f$ and capacitance $C_f$ formed in an electrode 10 upon a touch.

The capacitive touch panel includes a detection unit 20 as means for sensing a variation in voltage.

In the conventional capacitive touch panel, an input channel 21 for applying a reference signal generated by the detection unit 20 and a reception channel 22 for receiving the reference signal, the voltage of which has varied while passing through an electrode 10, are connected to the first side portion of the electrode via a single conducting wire.

This case is problematic in that the reference signal applied and the signal received after flowing through the electrode 10 use the single conducting wire, so that an error occurs in the measurement of a variation in voltage related to the received signal and thus it is not easy to accurately sense the location of a touch.

Here, the error in the measurement of the variation in voltage is proportional to a resistance component which is formed as the length of the electrodes 10 increases.

Accordingly, the conventional capacitive touch panel has the problem of not being applied to large-sized touch screen devices in which the length of electrodes 10 is long.

SUMMARY

Accordingly, the present invention has been made keeping in mind the above problems occurring in the prior art, and an object of the present invention is to provide a capacitive touch panel in which location sensing means formed in the touch panel is configured to receive a reference signal, the voltage of which has been altered by resistance and capacitance formed in an electrode while passing through the electrode when a touch is made while a reference signal is being applied to the first side portion of the electrode, via the second side portion of the electrode, thereby accurately measuring a variation in voltage compared to a conventional touch panel.

Another object of the present invention is to provide a capacitive touch panel which can be applied to large-sized touch screen devices using the above-described configuration.

The above objects are achieved by a capacitive touch panel, in which a location of a touch is sensed based on a variation in capacitance which is generated in an electrode upon a touch, the capacitive touch panel including one or more electrodes each configured to have an uniform resistance component in one direction on a substrate, and to pass a reference signal therethrough from a first side portion thereof to a second side portion thereof; and a location detection unit configured to apply the reference signal to the first side portion of the electrode, to receive a reference signal, altered by a resistance and a capacitance formed in the electrode upon a touch while passing through the electrode, via the second side portion of the electrode, and to determine a location of the touch by comparing the reference signal and the received altered reference signal.

Here, the location detection unit may include an input sensing channel for generating the reference signal, and applying the reference signal to the first side portion of the electrode; a reception sensing channel for receiving the reference signal, altered while passing through the electrode, via the second side portion of the electrode, and generating a location determination signal; a timer for measuring a time of the reference signal and a time of the location determination signal with respect to a constant period; a comparison unit for obtaining a difference between times of the reference signal and the location determination signal by comparing the time of the reference signal and the time of the location determination signal with respect to the constant period, which are measured using the timer; and a central processing unit for determining the location of the touch using the difference between the times.

Furthermore, the reception sensing channel may include a multiplexer (MUX), and generate the location determination signal by combining the reference signal and the altered reference signal.

Here, the reference signal may be provided in the form of a pulse signal in which a voltage repeatedly rises and falls for the constant period.

Preferably, the reference signal may be provided in the form of a triangular-waveform pulse signal.

Meanwhile, the location detection unit may include a first location detection unit for applying the reference signal to the first side of the electrode, and receiving the altered reference signal via the second side of the electrode; and a second location detection unit for, in response to the first location detection unit, applying the reference signal to the second side of the electrode, and receiving the altered reference signal via the first side of the electrode.

Here, the central processing unit may be provided to calculate the location of the touch by referring to a look-up table representative of correlations between contact distances to any one of first and second ends of the electrode and charge charging and discharging characteristics.

Furthermore, the electrodes may be formed of indium tin oxide (ITO), which is a transparent conductive material.

Furthermore, the electrodes may be formed to have a shape having a length greater than a width of the electrodes, and are disposed at equal intervals in one direction of the substrate.

Here, the electrodes may be formed to have a rectangular shape.

Here, the electrodes may be formed to have a geometrical shape in which a bent pattern is regularly repeated.

Furthermore, the geometrical shape is any one of '⚋', '⚌' and '⚍'.

Accordingly, the present invention can implement a capacitive touch panel which is capable of accurately measuring a variation in voltage compared to a conventional touch panel using the above-described technical solution.

Furthermore, the present invention can implement a capacitive touch panel which can be applied to large-sized touch screen devices using the above-described technical solution.

Figure 1:
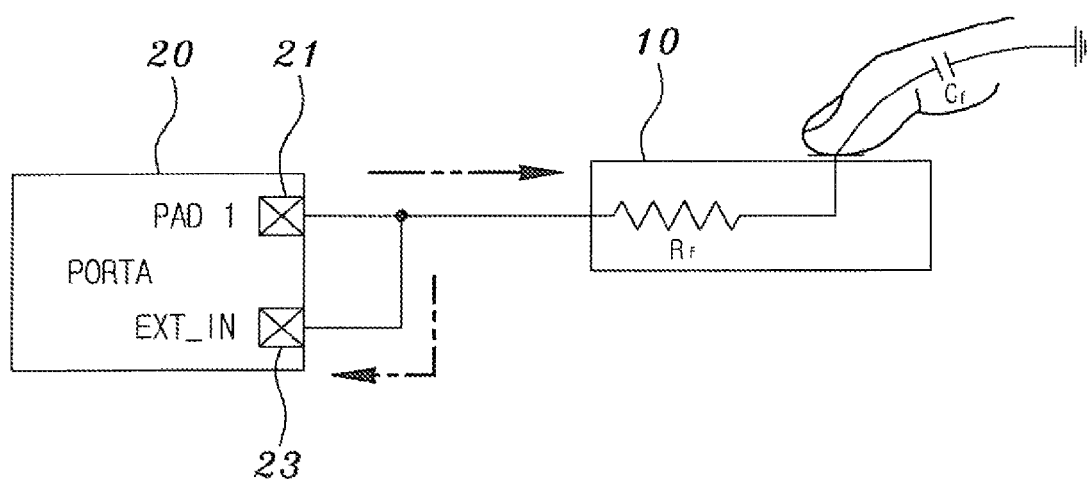
FIG. 1 is a diagram illustrating a method of sensing the location of a touch in a conventional capacitive touch panel.

| *Description of reference numerals of principal elements in the drawings* | |
|---|---|
| 100: electrode | 150: substrate |
| 200: location detection unit | |
| 210: input sensing channel | |
| 230: reception sensing channel | 1250: comparison unit |
| 270: central processing unit | 300: conducting wire |

DESCRIPTION

A capacitive touch panel according to the present invention will be described below with reference to the accompanying drawings.

Figure 2:
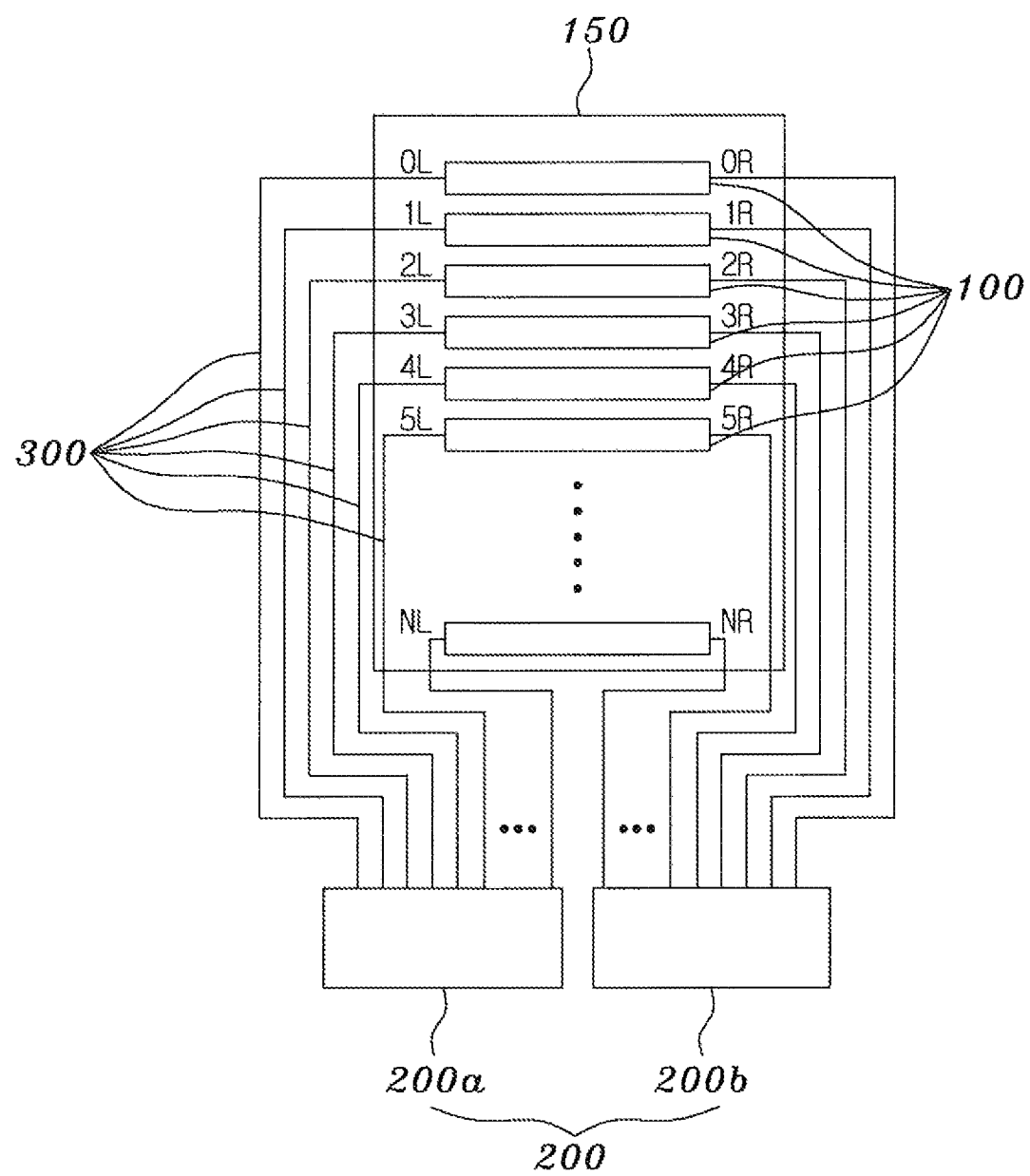
FIG. 2 is a drawing illustrating the schematic configuration of a capacitive touch panel according to an embodiment of the present invention.

FIG. 2 is a drawing illustrating the schematic configuration of a capacitive touch panel according to an embodiment of the present invention.

Referring to FIG. 2, the capacitive touch panel according to the present invention includes one or more electrodes 100 uniform in one direction on a substrate 150, and a location detection unit 200 for applying a reference signal to the first side of each of the electrodes 100, receiving the reference signal, altered by resistance and capacitance formed in the electrode 100 upon a touch while passing through the electrode 100, via a second side of the electrode 100, and determining the location of the touch by comparing the signals with each other.

Here, the location detection unit 200 is configured to include a first location detection unit 200a for applying a reference signal to the first side of the electrode 100 and receiving an altered reference signal via the second side of the electrode 100, and a second location detection unit 200b for, in response to the first location detection unit 200a, applying a reference signal to the second side of the electrode 100, and receiving an altered reference signal via the first side of the electrode 100.

The electrodes 100 are formed by coating the substrate 150 with a transparent conductive material having a uniform resistance component, such as indium tin oxide (ITO), to a uniform thickness using, for example, vacuum deposition.

Here, the substrate 150 is generally formed of a transparent film or glass which can be coated with the electrodes 100 made of a material such as ITO.

Although the shape of the electrodes 100 may vary depending on each embodiment of the capacitive touch panel according to the present invention, the electrodes 100 are placed at regular intervals in one direction of the substrate 150.

Here, adjacent electrodes 100 are electrically separated from each other, and the electrodes 100 extend in a specific axial direction on the substrate 150.

Since the shape has a length greater than the width of the electrodes 100, as shown in FIG. 2 illustrating an embodiment of the present invention, the electrodes 100 may be defined as having a shape which extends in an axial direction indicative of an up and down direction.

Here, although the electrodes 100 of the present invention may be formed in the shape of a rectangle having a uniform width and length, as shown in FIG. 2 illustrating an embodiment of the present invention, the shape of the electrodes 100 includes all shapes of the electrodes 100 which extend in one direction, according to other embodiments of the present invention.

Figure 3:
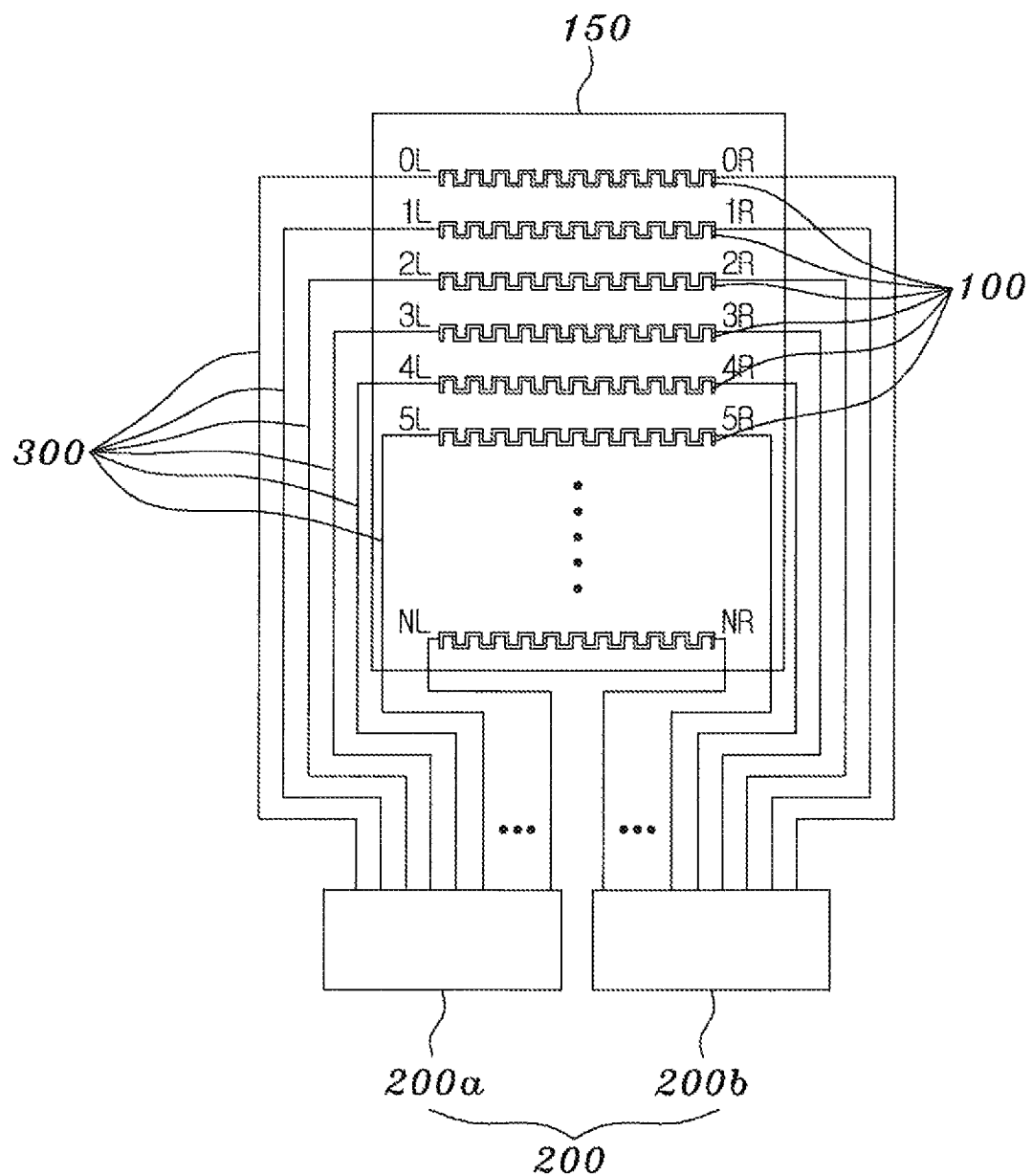
FIG. 3 is a drawing illustrating the schematic configuration of a capacitive touch panel according to another embodiment of the present invention.
Figure 4:
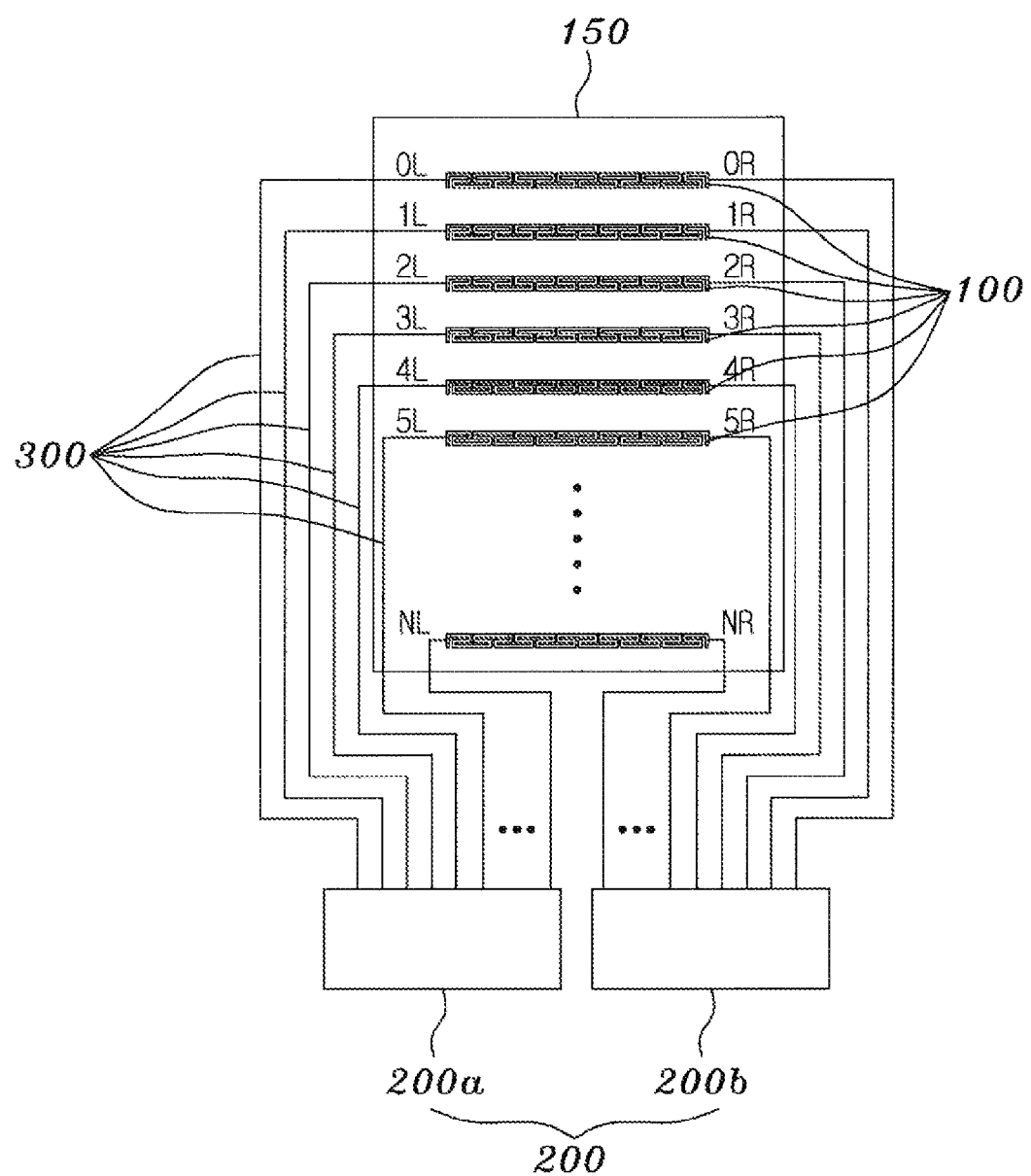
FIG. 4 is a drawing illustrating the schematic configuration of a capacitive touch panel according to still another embodiment of the present invention.
Figure 5:
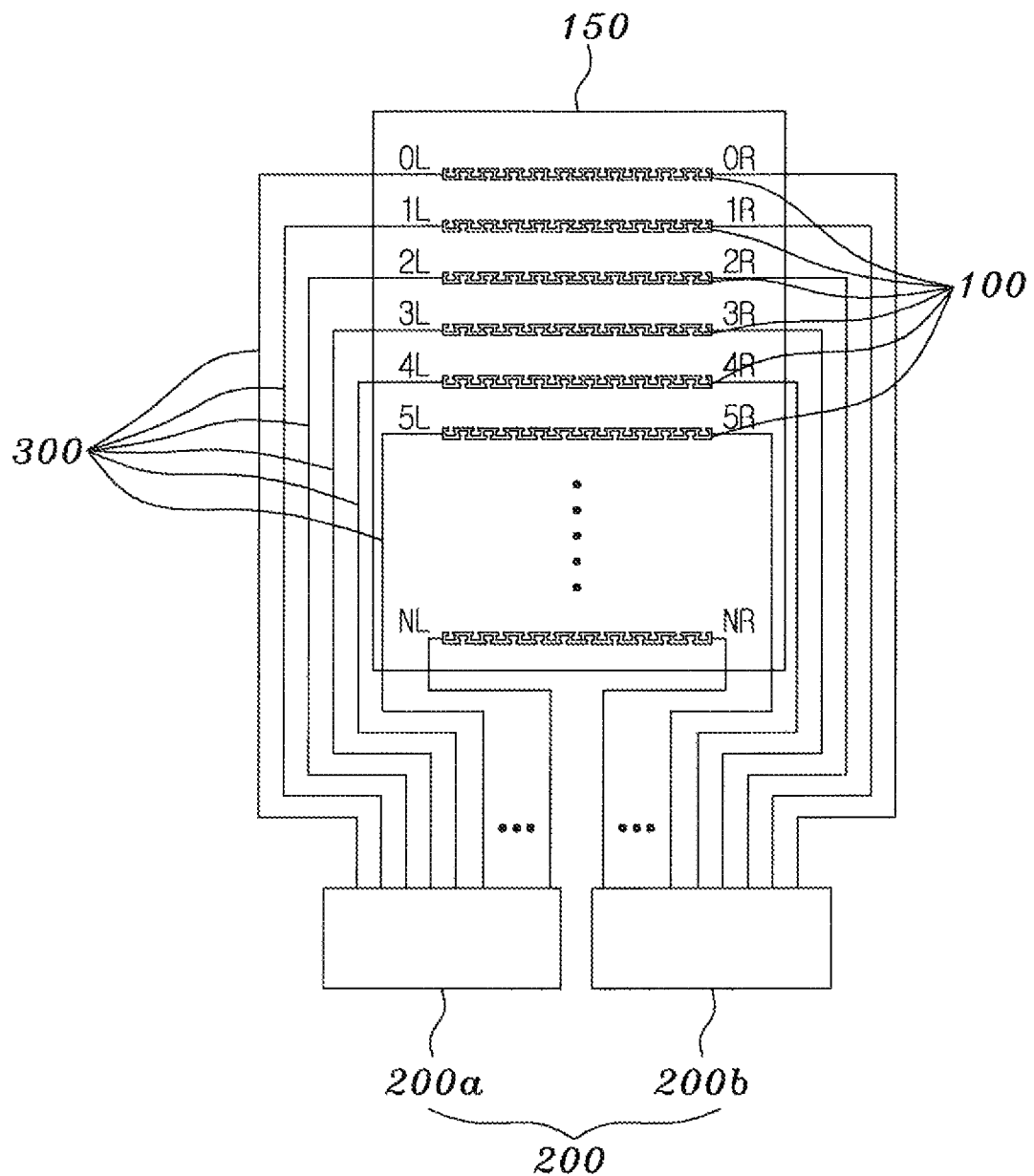
FIG. 5 is a drawing illustrating the schematic configuration of a capacitive touch panel according to still another embodiment of the present invention.

That is, the electrode 100 may not only be formed in the shape of a rectangle, as shown in FIG. 2, but may also be formed to have shapes in each of which a bent geometrical pattern is regularly repeated, as shown in FIGS. 3 to 5.

The electrodes 100 formed to have a shape, such as those shown in FIGS. 3 to 5, can increase terminal resistance to a value higher than an existing resistance value, and uniformity can also be maintained when the basic unit of the geometrical shape is made small.

Here, the geometrical shape may be '' shown in FIG. 3, '' shown in FIG. 4, '' shown in FIG. 5, or the like.

When the electrodes 100 are implemented to have one of the above geometrical shapes, the signal delay effect attributable to R-C is maximized in the case where the terminal resistance between the left and right sides of the electrode 100 is high, so that it is preferable that the terminal resistance value of the sensing electrodes 100 be a value in the state of being uniform along the length between left and right sides.

Conducting wires 300 are connected the first and second side ends of each of the electrodes 100.

Here, each of the electrodes 100 is electrically connected to the location detection unit 200 via the conducting wires 300, and the location detection unit 200 receives a sensing signal generated in the electrode 100 by a touch via the conducting wire 300 and determines the presence and location of the touch.

A physical and logical connection structure which connects each of the electrodes 100 with the location detection unit 200 so as to sense a touch on the electrode 100, to which an electrical signal is applied, and via which an electrical signal is received is defined as a sensing channel.

In the following description, the meaning of the sensing channel will be used to cover electrical signal application means and reception means including the conducting wires 300.

In the present invention, the sensing channel is configured by separating it into an input sensing channel 210 connected to the first side portion of the electrode 100, and a reception sensing channel 230 connected to a second side portion placed at a location corresponding to that of the first side portion of the electrode 100, unlike that implemented in the conventional capacitive touch panel.

Figure 6:
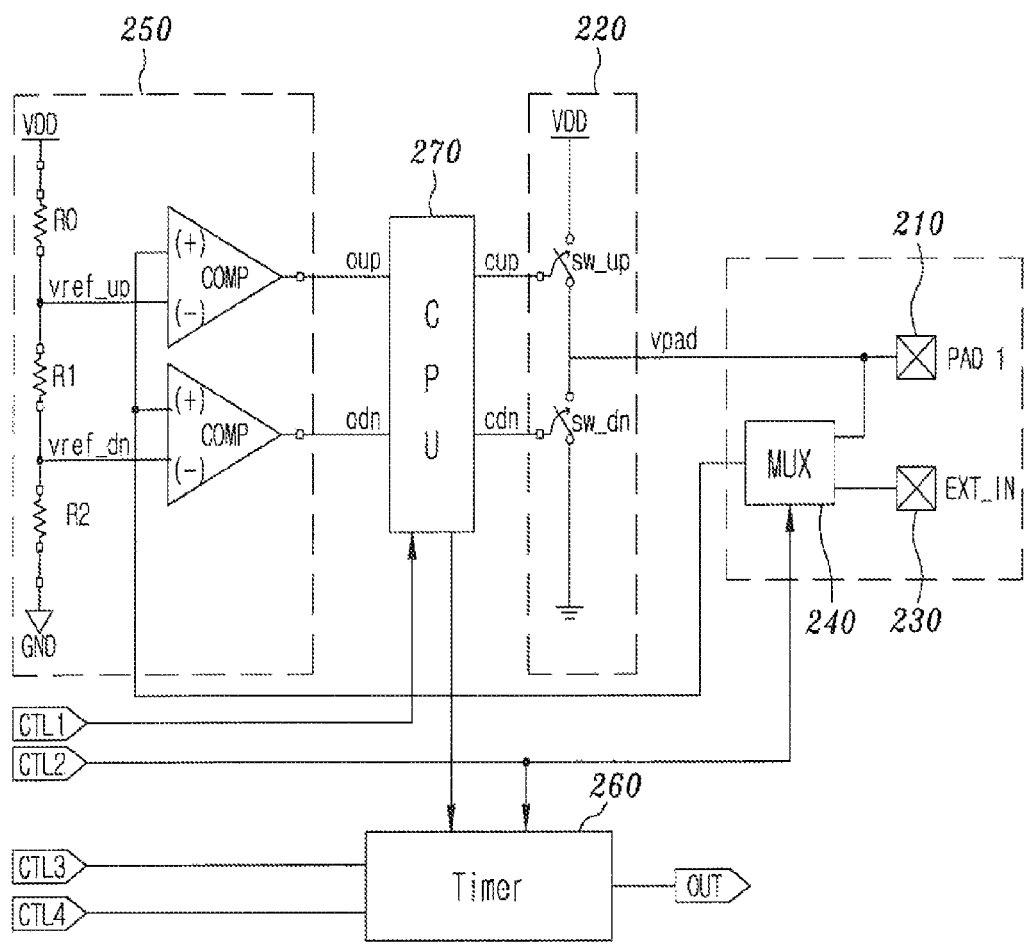
FIG. 6 is a schematic circuit diagram illustrating the internal configuration of the location detection unit connected to the transparent electrodes and configured to determine the presence and location of a touch.
Figure 7:
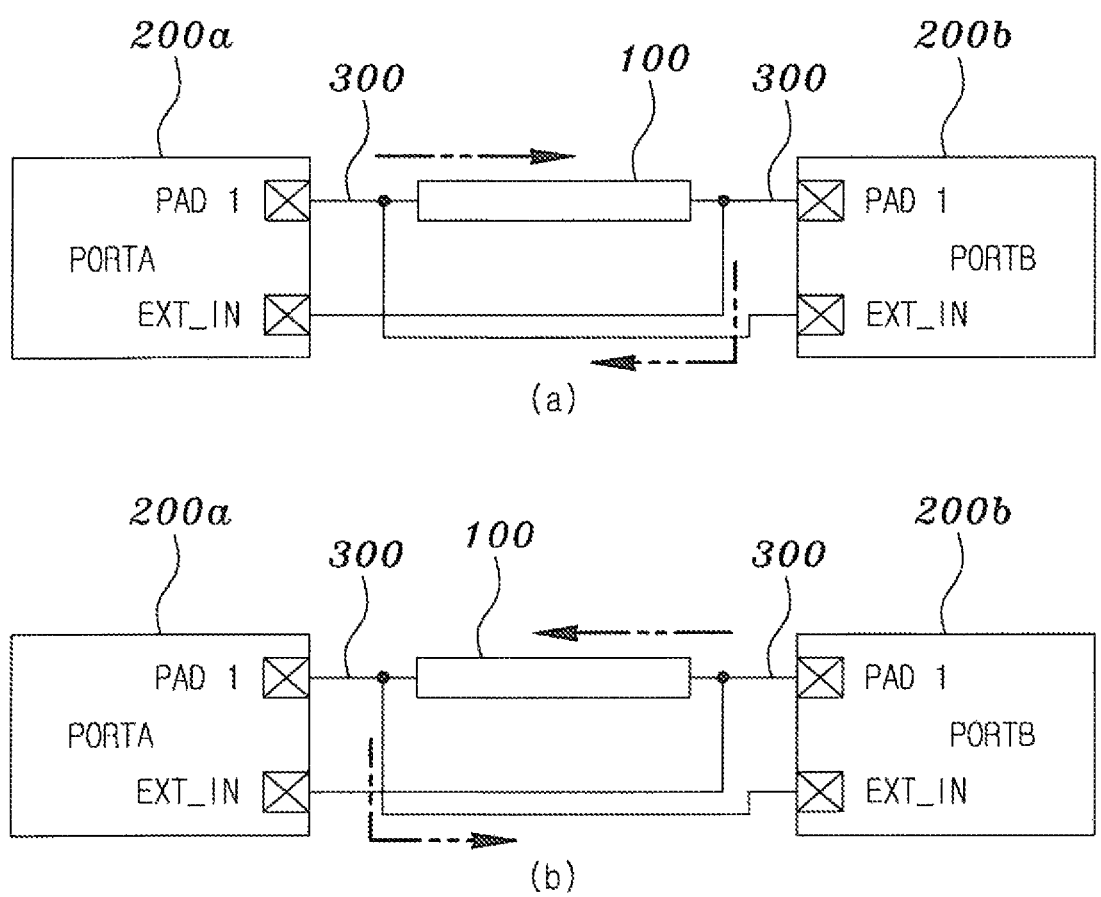
FIG. 7 is a diagram illustrating the flow of a reference signal in a capacitive touch panel according to an embodiment of the present invention.

FIG. 6 is a schematic circuit diagram illustrating the internal configuration of the location detection unit 200 connected to the transparent electrodes 100 and configured to determine the location of a touch.

Referring to FIG. 6, the location detection unit 200 includes an input sensing channel 210 for generating a reference signal and applying the reference signal to the first side portion of each of the electrodes 100, a reception sensing channel 230 for receiving the reference signal, altered while passing through the electrode 100, via the second side portion of the electrode 100 and generating a location determination signal, a timer 260 for measuring the time of the reference signal and the time of the location determination signal with respect to a constant period, a comparison unit 250 for obtaining the difference between the times of the reference signal and the location determination signal by comparing the time of the reference signal and the time of the location determination signal with reference to the constant period measured by the timer 260, and a central processing unit 150 for determining the location of a touch using the difference between the times.

Here, input sensing channels 210 and reception sensing channels 230 may be provided to correspond to the number of electrodes 100, that is, N, and a connection to one of the N electrodes 100 is made via any one of N sensing channels.

The reference signal is provided in the form of a pulse signal in which a reference voltage repeatedly rises and falls for a constant period. To generate the signal, a reference signal generation unit 220 including a switching circuit is configured.

The reference signal may be provided in the form of a variety of types of pulse waves having constant periods. Preferably, the reference signal may be provided in the form of a triangular-waveform pulse signal which easily exhibits the charging and discharging characteristics of the signal.

The reference signal is applied via the input sensing channel 210, and is subjected to the difference between the times $\Delta t$ with respect to the time response, resulting from a variation in voltage caused by resistance and capacitance formed in the electrode 100 upon a touch, while passing through the electrode 100. The altered reference signal is received by the reception sensing channel 230. The present invention is configured to determine the location of a touch on the electrode 100 using the received altered reference signal.

Here, to compare the difference between the times, it is necessary to synchronize the reference signal applied to the electrode 100 and the altered reference signal with respect to the time axis.

For this purpose, a multiplexer 240 MUX which is connected to the reception sensing channel 230 and generates the location determination signal by combining and synchronizing the reference signal and the altered reference signal is configured.

Figure 8:
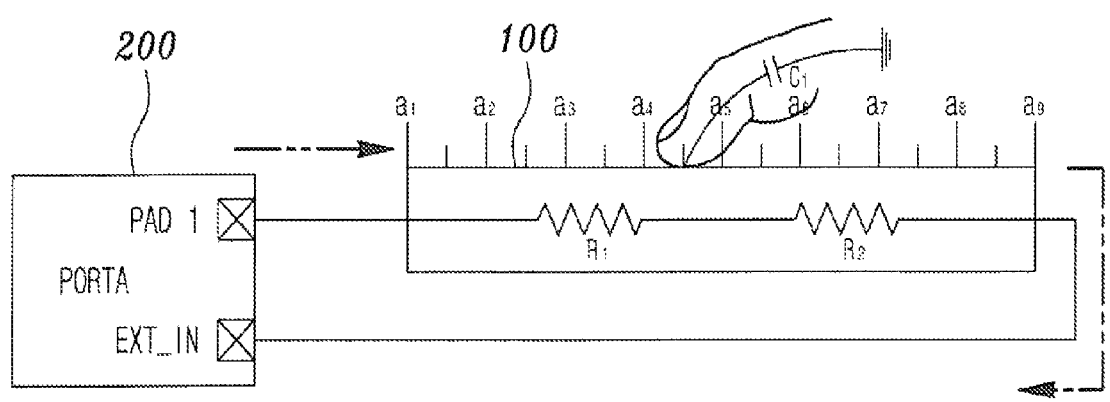
FIG. 8 is a drawing illustrating a method of sensing the location of a touch in a capacitive touch panel according to another embodiment of the present invention.

That is, as shown in FIG. 8, which is a drawing illustrating a method of sensing a touch in a touch panel according to an embodiment of the present invention, charging and discharging characteristics with respect to the reference signal are exhibited by resistance formed in the electrode 100 and capacitance formed by a touching object, such as a touching finger, upon a touch. The location of a touch on the electrode 100 with respect to the axial direction component can be determined using a temporal variation in the reference signal with respect to the voltage resulting from the charging and discharging characteristics.

In detail, when a touch is generated on the electrode 100 formed on the substrate 150 when the electrode 100 formed on the substrate 150 is touched, capacitance C1 is generated on a touched surface by a touching object, such as a finger, and resistances $R_1$ and $R_2$ which are proportional to the distances to the location of the touch on the electrode 100 based on the location of the touch to are generated on the electrode 100.

The resistances $R_1$ and $R_2$ are determined by the distances and the sheet resistance value of the electrode 100.

In general, when the electrode 100 employs ITO as a transparent conductive material, a sheet resistance value in a range of about 10 $\Omega$/sq~1 k$\Omega$/sq can be obtained.

When a contact is generated by the touch, a variation in voltage is generated by the application of a reference signal to the electrode 100 due to an RC equivalent circuit resulting from the resistance and capacitance formed in the electrode 100.

Here, time constant $\tau$ which determines the variation in voltage over time is dependent upon the resistance component $R_1$, which belongs to the resistance components formed in the electrode 100 and is formed up to the location of the touch where capacitance is formed after the reference signal has been applied, and the capacitance $C_1$, which is expressed by the following Equation:

$$\tau = R_1 \times C_1 \quad (1)$$

Furthermore, the variation in voltage over time V(t) which occurs after the redistribution of charges attributable to a contact upon a touch has been completed is expressed using the time constant shown in Equation 1, as follows:

$$V(t) = V_f + (V_0 - V_f)e^{-\frac{t}{\tau}} \quad (2)$$

In Equation 2, $V_0$ is the initial reference voltage of the reference signal, and $V_f$ is the final voltage after the redistribution of charges attributable to the contact has been completed.

As can be seen from Equation 2, the variation in voltage over time varies depending on the value of the time constant $\tau$.

Furthermore, the value of the time constant $\tau$ is proportional to the resistance component $R_1$ formed up to the location of the touch by the touch on the electrode 100 and to the capacitance $C_1$ formed by the touch, as can be seen from Equation 1.

Here, although capacitance $C_1$ may vary depending on the type of touching object or the intensity of the touch, the value of the variation is insignificant. Therefore, the value of the time constant $\tau$ is chiefly determined depending on the resistance component $R_1$ which linearly varies depending on the location of the touch.

Accordingly, when the variation in voltage over time V(t) which varies depending on the variation in time constant $\tau$ is determined, the location of the touch can be determined based on one end of the electrode 100.

That is, when the difference between the times Δt is compared with respect to the pulse period of the reference signal attributable to the charging and discharging characteristics of the voltage time based on the variation in voltage over time V(t), the location of the touch can be calculated.

Figure 9:
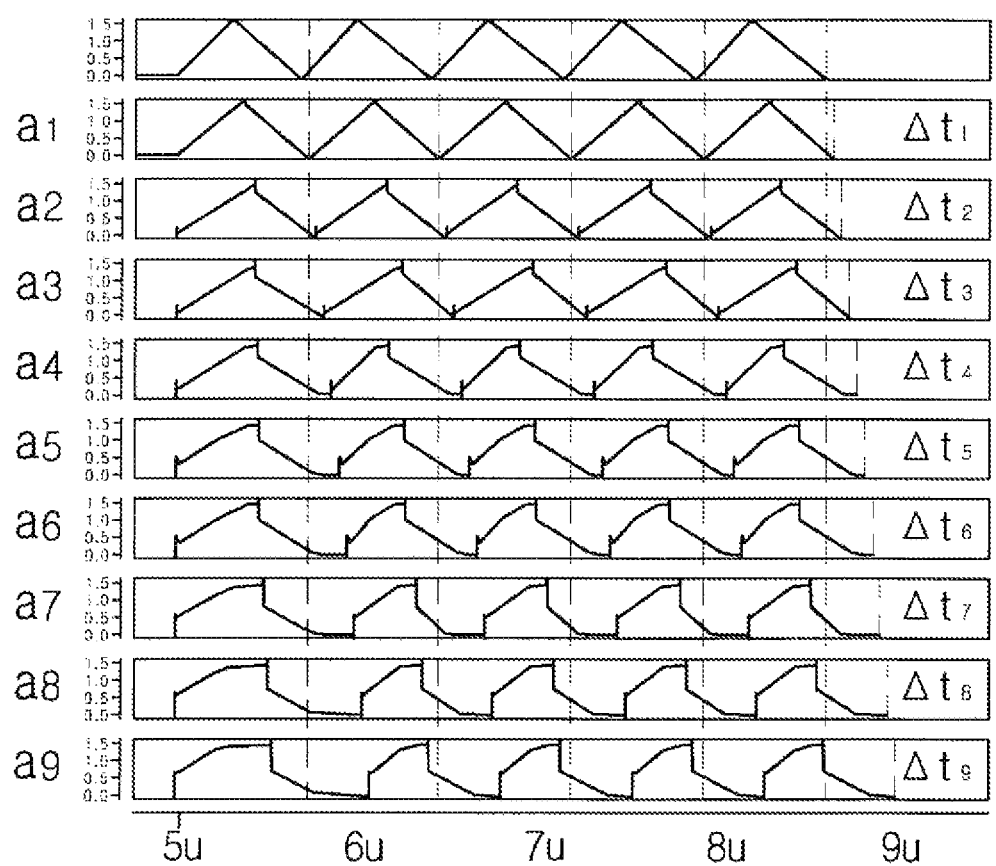
FIG. 9 is a drawing illustrating the waveforms of altered reference signals on the capacitive touch panel according to an embodiment of the present invention.

This can be seen from FIG. 9 which is a drawing illustrating the waveforms of altered reference signals which depend on the locations at which touches occur.

The waveforms of FIG. 9 are waveforms that are sensed by the reception sensing channel 230 when the locations of contacts a1, a2, a3, ... , and a9 of the electrode 100 are touched, as shown in FIG. 8. It can be seen that the difference between the times with respect to the pulse period of a reference waveform gradually increases as the distance from the location of a touch to one end of the electrode 100 increases.

Since the difference between the times is added for each pulse period of a reference signal and then charging and discharging are performed, it is preferable that measurement be performed for a plurality of pulse periods rather than for a pulse period of the reference signal.

Based on the above-described principle, a method of determining the location of a touch when a user's touch occurs on the electrode 100 will now be described.

The first side end of each of a plurality of electrodes 100 is connected to the input sensing channel 210 via the conducting wire 300, and the second side end of the corresponding electrode 100 is connected to the reception sensing channel 230.

Referring to FIGS. 2 and 8 illustrating embodiments of the present invention, the input sensing channel 210 and the reception sensing channel 230 are connected to the location detection unit 200.

The location detection unit 200 includes the first location detection unit 200*a* and the second location detection unit 200*b* which are capable, of driving reference signals to the first and second sides of the electrode 100 correspondingly.

Here, the input sensing channel 210 and reception sensing channel 230 of each of the first location detection unit 200*a* and the second location detection unit 200*b* are cross-connected.

That is, as shown in FIG. 8, the input sensing channel 210 of the first location detection unit 200*a* is connected to the reception sensing channel 230 of the second location detection unit 200*b*, and the input sensing channel 210 of the second location detection unit 200*b* is connected to the reception sensing channel 230 of the first location detection unit 200*a*.

The reason for this is to enable the first location detection unit 200*a* and the second location detection unit 200*b* to cross-drive reference signals at constant period intervals at symmetrical ends of the electrodes 100.

Furthermore, since the plurality of electrodes 100 are placed at equal intervals and arranged in a line, a location in the Y-axis direction, that is, the one axial direction of the location of a touch, is determined based on the location of an electrode 100 upon a touch.

The determination of the location of a touch in the Y-axis direction is performed by the central processing unit 150 formed in the location detection unit 200.

The determination of the location of a touch in the X-axis direction is performed based on the difference between the times Δt with respect to the pulse period of a reference signal resulting from the charging and discharging characteristics attributable to the resistance and the capacitance formed in the electrode 100, as described above.

The determination of the difference between the times Δt is performed by comparing the location determination signal, generated through the reception sensing channel 230 and the multiplexer, and the reference signal using a comparator formed in the comparison unit 250.

The comparison of the reference signal and the location determination signal is performed using a variation in voltage for a reference time or the time it takes for the voltage to change to a reference voltage, as described above.

The central processing unit 150 calculates the distance from the first end of the electrode 100 to the location of a touch using the above comparison.

Here, the central processing unit 150 may refer to a look-up table which is referred to in order to calculate the distance.

Here, the look-up table is a diagram which represents the correlations between contact distances to any one of the first and second ends of the electrode and charge charging and discharging characteristics.

Accordingly, the correlations between the distances and the charge charging and discharging characteristics are previously recorded in the look-up table, and the central processing unit 150 calculates a distance based on the charge charging and discharging characteristics by referring to the look-up table, thereby increasing the computational speed and also reducing the complexity of implementation.

The terms used in the present specification and the accompanying claims should not be limitedly interpreted as having meanings found in dictionaries, but should be interpreted as having meanings consistent with the technical spirit of the present invention on the basis of the principle that an inventor can appropriately define the concepts of terms in order to best describe his or her invention.

Accordingly, since not only the embodiments described in the present specification but also the shapes and the configurations illustrated in the drawings do not represent all the technical spirit of the present invention, it should be understood that a variety of equivalents and variations which could replace the embodiments, the shapes and the configurations might exist when the present invention was filed.

What is claimed is:

1. A capacitive touch panel, in which a location of a touch is sensed based on a variation in capacitance which is generated in an electrode upon a touch, the capacitive touch panel comprising:
   one or more electrodes each configured to have an uniform resistance component in one direction on a substrate, and to pass a reference signal therethrough from a first side portion thereof to a second side portion thereof; and
   a location detection unit configured to apply the reference signal to the first side portion of the electrode, to receive a reference signal, altered by a resistance and a capacitance formed in the electrode upon a touch while passing through the electrode, via the second side portion of the electrode, and to determine a location of the touch by comparing the reference signal and the received altered reference signal.

2. The capacitive touch panel of claim 1, wherein the location detection unit comprises:
   input sensing channel for generating the reference signal, and applying the reference signal to the first side portion of the electrode;
   a reception sensing channel for receiving the reference signal, altered while passing through the electrode, via the second side portion of the electrode, and generating a location determination signal;
   a timer for measuring a time of the reference signal and a time of the location determination signal with respect to a constant period;
   a comparison unit for obtaining a difference between times of the reference signal and the location determination signal by comparing the time of the reference signal and the time of the location determination signal with respect to the constant period, which are measured using the timer; and
   a central processing unit for determining the location of the touch using the difference between the times.

3. The capacitive touch panel of claim 2, wherein the reception sensing channel comprises a multiplexer (MUX), and generates the location determination signal by combining the reference signal and the altered reference signal.

4. The capacitive touch panel of claim 1, wherein the reference signal is provided in a form of a pulse signal in which a voltage repeatedly rises and falls for the constant period.

5. The capacitive touch panel of claim 4, wherein the reference signal is provided in a form of a triangular-waveform pulse signal.

6. The capacitive touch panel of claim 1, wherein the location detection unit comprises:
   a first location detection unit for applying the reference signal to the first side of the electrode, and receiving the altered reference signal via the second side of the electrode; and
   a second location detection unit for, in response to the first location detection unit, applying the reference signal to the second side of the electrode, and receiving the altered reference signal via the first side of the electrode.

7. The capacitive touch panel of claim 6, wherein the central processing unit is provided to calculate the location of the touch by referring to a look-up table representative of correlations between contact distances to any one of first and second ends of the electrode and charge charging and discharging characteristics.

8. The capacitive touch panel of claim 1, wherein the electrodes are formed of indium tin oxide (ITO), which is a transparent conductive material.

9. The capacitive touch panel of claim 8, wherein the electrodes are formed to have a shape having a length greater than a width of the electrodes, and are disposed at equal intervals in one direction of the substrate.

10. The capacitive touch panel of claim 9, wherein the electrodes are formed to have a rectangular shape.

11. The capacitive touch panel of claim 9, wherein the electrodes are formed to have a geometrical shape in which a bent pattern is regularly repeated.

12. The capacitive touch panel of claim 11, wherein the geometrical shape is any one of ' ⎍ ', ' ⧓ ' and ' ⋈ '.

* * * * *